United States Patent [19]

Fukui

[11] 4,407,003

[45] Sep. 27, 1983

[54] THERMAL PRINTER

[75] Inventor: Hiroshi Fukui, Yokosuka, Japan

[73] Assignee: Canon Kabushiki Kaisha, Tokyo, Japan

[21] Appl. No.: 340,221

[22] Filed: Jan. 18, 1982

[30] Foreign Application Priority Data

Mar. 5, 1981 [JP] Japan .................................. 56-31890

[51] Int. Cl.3 .............................................. G01D 15/10

[52] U.S. Cl. ................................ 346/76 PH; 400/120

[58] Field of Search .................... 346/76 PH; 400/120; 219/216 PH

[56] References Cited

U.S. PATENT DOCUMENTS 4,309,712 12/1979 Iwakura ......................... 346/76 PH 4,370,666 1/1983 Noda ............................. 346/76 PH

*Primary Examiner*—Joseph W. Hartary

*Assistant Examiner*—Derek Jennings

*Attorney, Agent, or Firm*—Fitzpatrick, Cella, Harper & Scinto

[57] ABSTRACT

A thermal printer is provided in which a source voltage is detected and the driving time of a thermal head as well as the driving time of a motor for driving the thermal head, are suitably controlled according to the result of the detection.

5 Claims, 5 Drawing Figures

| DETECTED VOLTAGE | HEXADECIMAL | HEATING TIME OF THERMAL HEAD | DRIVING TIME OF MOTOR | CONDITION |
|---|---|---|---|---|
| ~ 3.1v | ~ 61 | 8.0 ms | 20 ms | 4 PHASES EXCITED-TYPE |
| 3.1v ~ 3.5v | 61 ~ 6E | 5.6 ms | 16 ms | PULSE MOTOR |
| 3.5v ~ 3.9v | 6E ~ 7B | 4.1 ms | 13 ms | RESISTANCE OF WINDING (63Ω/PHASE) |
| 3.9v ~ 4.3v | 7B ~ 87 | 2.8 ms | 10 ms | 1x7 THERMAL HEAD DOT RESISTANCE 11Ω + 15 % |
| 4.3v ~ 4.7v | 87 ~ 94 | 2.0 ms | 8 ms | |
| 4.7v ~ 5.1v | 94 ~ A1 | 1.5 ms | 6.5 ms | BATTERY TO BE USED |
| 5.1v ~ 5.5v | A1 ~ AE | 1.2 ms | 5.5 ms | Mn BATTERY UM-3 x 4 |
| 5.5v ~ 5.9v | AE ~ BA | 0.9 ms | 4.5 ms | |
| 5.9v ~ 6.3v | BA ~ C7 | 0.7 ms | 4.0 ms | |
| 6.3v ~ | C7 ~ | 0.6 ms | 3.8 ms | |
| ~25v 7.5v ~ | ——— | ERROR PROCESS | ERROR PROCESS | |

FIG. 2

THERMAL PRINTER

BACKGROUND OF THE INVENTION

1. Field of the Invention

The present invention relates to a thermal printer and more particularly to a thermal printer with which the uniformity of print density can be maintained. In particular, the present invention is directed a thermal printer provided with means for always maintaining the print density uniform even when there occurs any variation in the voltage of power source (for example, dry element battery, solar battery or other electric power source the output of which varies greatly).

2. Description of the Prior Art

In the above mentioned type of thermal printer, the print density becomes thinner with a decrease of the voltage of the battery used in the printer. Therefore, it has been a common practice to exchange an old battery for a new one before the print density has become very thin. However, frequent exchanges of batteries, especially at short intervals is troublesome to the operator.

SUMMARY OF THE INVENTION

Accordingly, it is the object of the present invention to eliminate the disadvantage mentioned above.

To attain the object according to the invention, the voltage drop of the battery in use is detected before the print density begins to decrease and the print density is maintained by slowing down the printing speed according to the detected voltage.

Other and further objects, features and advantages of the invention will appear more fully from the following description taken in connection with the accompanying draings.

BRIEF DESCRIPTION OF THE DRAWINGS

FIG. 2 shows an example of the content of a program table used in the embodiment;

DETAILED DESCRIPTION OF THE INVENTION

Figure 1:
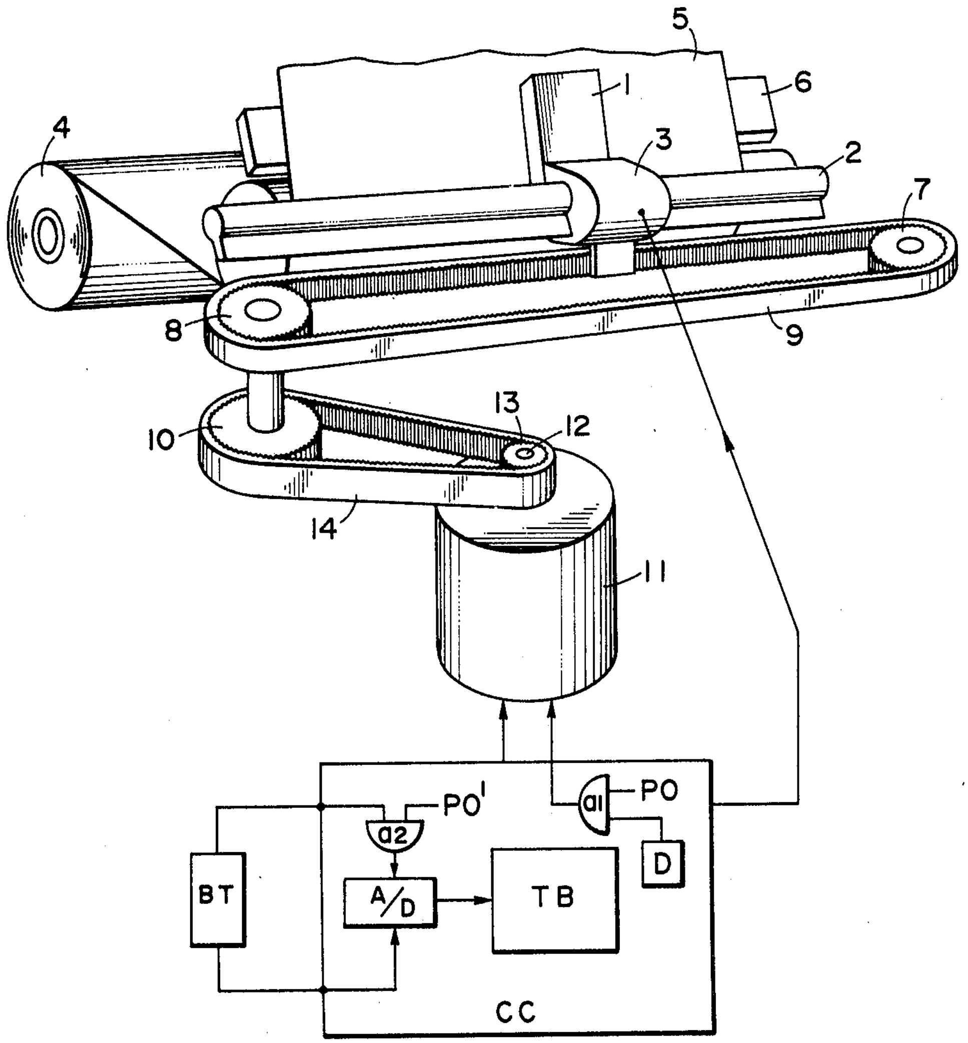
FIG. 1 shows an embodiment of the present invention.

Referring first to FIG. 1 there is shown an embodiment of the thermal printer according to the invention. The thermal printer has seven heating elements arranged in a line. A thermal head 1 is fixed on a carriage 3 which is in turn mounted on a horizontally disposed slide shaft 2. The carriage 3 together with the thermal head 1 can slide along the slide shaft 2. The thermal head 1 is disposed facing a printing paper 5 fed from a supply paper roll 4. Through the printing paper 5, the head is pressed against a platen 6.

An endless belt 9 extends between two pulleys 7 and 8. The carriage 3 is fixed to the endless belt 9 through a mounting member. Coaxially connected to the pulley 8 is a pulley 10 having a larger diameter. 11 is a pulse motor which has a pulley 13 fixedly mounted on its output shaft 12. An endless belt 14 extends between the pulleys 10 and 13.

With the rotation of the pulse motor 11, the thermal head 1 is moved stepwise to effect printing on the printing paper.

The control part CC contains therein an analog-digital converter A/D which detects the analog value of the voltage of the battery BT and converts the detected analog value into a digital value. TB is a read-only memory in which a program table is stored for setting the heating time of thermal head and the driving time of motor according to the output from the converter A/D. An example of the such program table is shown in FIG. 2.

In accordance with the content of the program table stored in the memory TB, the heating time of thermal head and the driving time of motor are automatically determined depending on the battery voltage then detected. After determining the thermal head heating time and the motor driving time in this manner, printing is sequentially executed with the thermal head heating time and the motor driving time then set as shown in the timing chart of FIG. 3. The motor 11 may be, for example, a 4-phase pulse motor which is driven in two phases excited system.

It is preferred that the detection of the output voltage of battery BT should be carried out during the time when the thermal head 1 and the motor 11 are actually operating. Also, an accurate detection of the source voltage may be attained by using an artificial load which simulates the load in the above operation. However, the provision of a particular artificial load is not the better way to detect the source voltage accurately.

Figure 3:
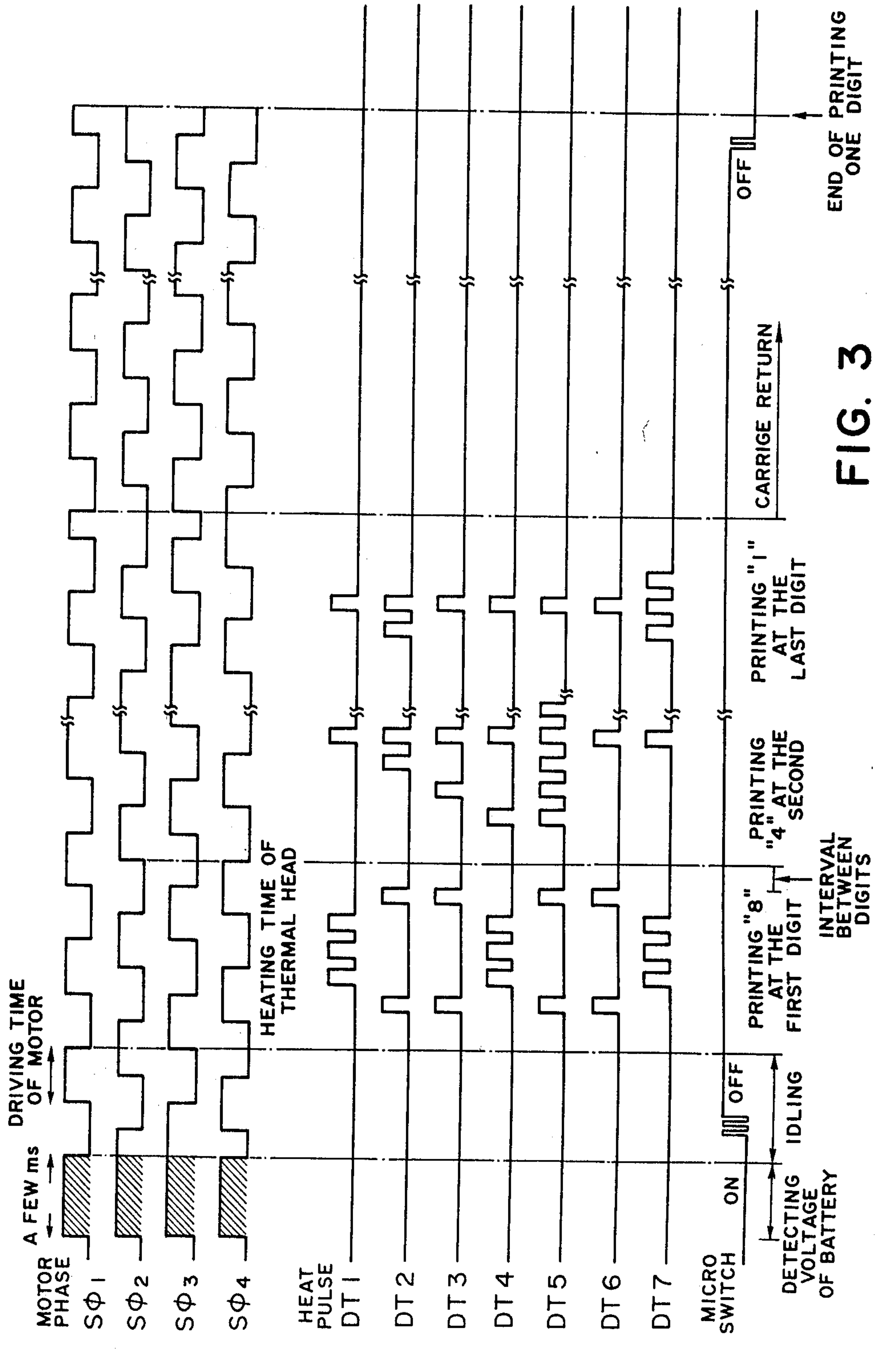
FIG. 3 is a waveform chart for illustrating the operation of the printer.

Therefore, according to the embodiment of the invention, the detection of the source voltage is carried out by producing all of the pulses $S\phi 1 - S\phi 4$ at the same time as seen from FIG. 3. The reason for this is that the load added when all of four phases of the pulse motor 11 are driven has been found to be very similar to the load added in the above actual operation of the printer. We have found that by making use of this favorable fact, the detection of source voltage can be carried out with a relatively high accuracy.

For this detection, AND gate a1 is opened simultaneous with the issuance of print instruction signal PO after the carriage 3 has arrived at its home position. An output of a driver D for driving four phases of the pulse motor 11 at the same time is applied to the motor. A determined time thereafter, AND gate a2 is also opened to start detecting the source voltage.

This detection is carried out several times at determined time intervals. Within the A/D converter, the sampled values are divided by the number of samplings to obtain a mean value. By means of the obtained digital mean value, the program table TB is addressed to determine the heating time of thermal head and the driving time of motor in the manner as described above. After setting the thermal head heating time and the motor driving time, printing is executed in the manner shown in FIG. 3.

The voltage detection may be carried out at any suitable time, for example, at every time of print instruction issuance as described above or immediately after the end of printing or during a printing operation.

Figure 4B:
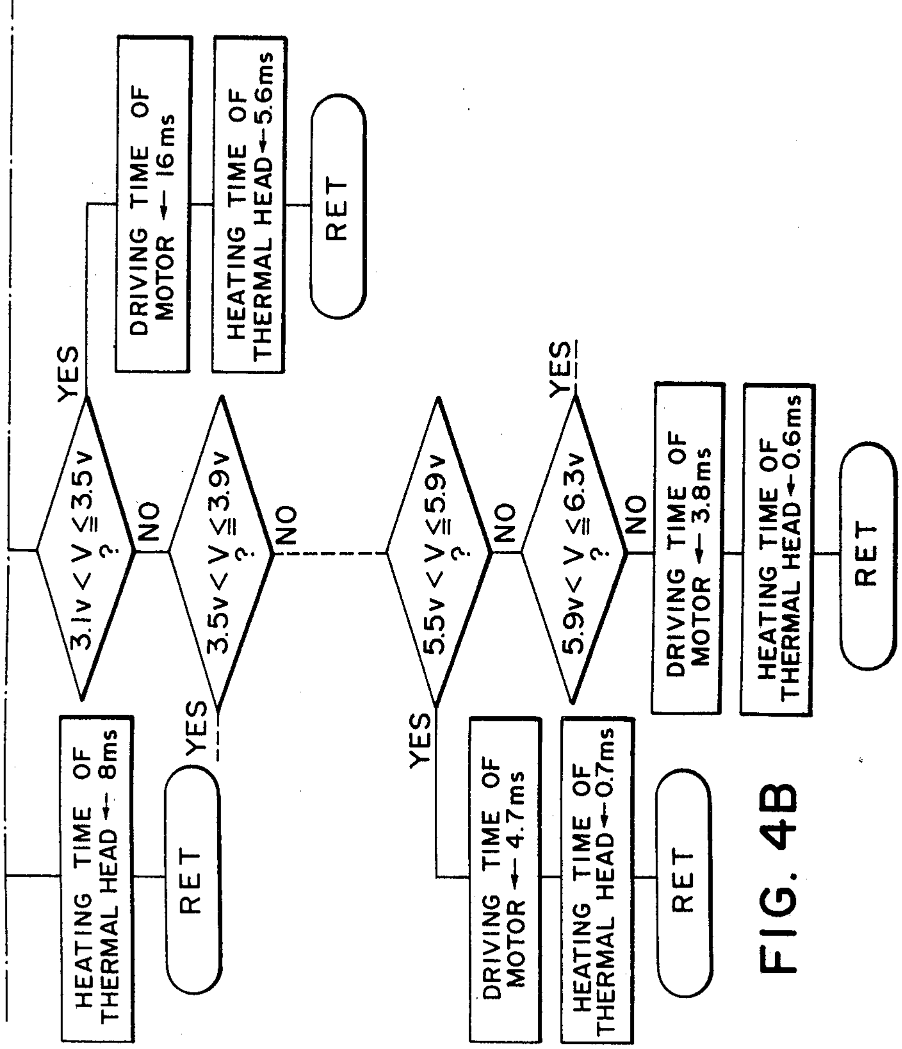
FIGS. 4A and 4B show in these combination flow chart showing the operation.
Figure 4:
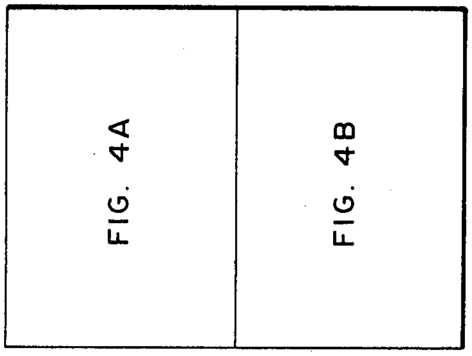
Figure 4A:
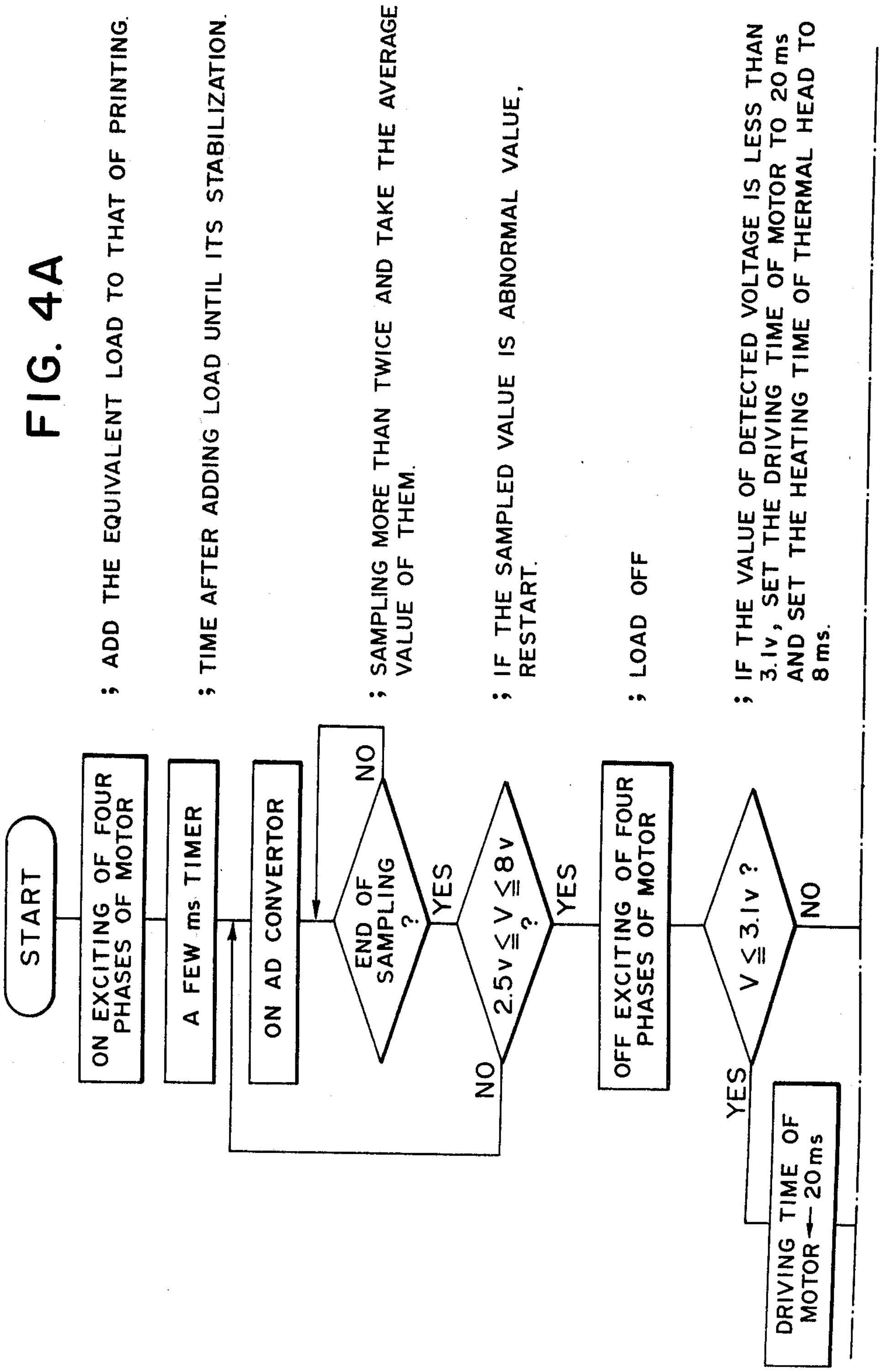

FIG. 4 is a flow chart illustrating the manner of operation of the above embodiment.

While the invention has been particularly shown and described with reference to a preferred embodiment thereof, it will be understood by those skilled in the art that the foregoing and other changes in form and details can be made therein without departing from the spirit and scope of the invention.

What I claim is:

1. A thermal printer, comprising:

a thermal head;

a motor for driving said thermal head;

a power source for heating said thermal head and for driving said motor; and means for detecting a voltage of said power source used in a printer, for controlling a period of time for heating said thermal head and for driving said motor in accordance with the result of said detection.

2. A thermal printer as set forth in claim 1, wherein at the time when the voltage of said power source is detected, an artificial load is connected to said motor.

3. A thermal printer as set forth in claim 2, wherein said artificial load includes the motor.

4. A thermal printer, comprising:

a thermal head;

a power source for energizing said thermal head;

means for detecting a voltage of said power source, and for calculating a mean voltage value from the detected voltage; and means for controlling the energization of said thermal head in accordance with the mean voltage value calculated.

5. A thermal printer according to claim 4, further comprising:

a motor for moving said thermal head; and means for connecting said detecting means to said motor as a pseudo load when the voltage of said power source is detected.

* * * * *